United States Patent
Chang

(10) Patent No.: US 8,646,811 B1
(45) Date of Patent: Feb. 11, 2014

(54) QUICK CONNECTOR

(75) Inventor: Jen-Chih Chang, Taichung (TW)

(73) Assignee: Su Bei Guang Corporation, Taichung (TW)

( * ) Notice: Subject to any disclaimer, the term of this patent is extended or adjusted under 35 U.S.C. 154(b) by 45 days.

(21) Appl. No.: 13/569,579

(22) Filed: Aug. 8, 2012

(51) Int. Cl.
*F16L 37/18* (2006.01)
*F16L 35/00* (2006.01)
*F16L 37/00* (2006.01)
*F16L 37/28* (2006.01)

(52) U.S. Cl.
USPC .......... 285/316; 285/1; 251/149.1; 251/149.9

(58) Field of Classification Search
USPC ........ 285/1, 276, 277, 316; 251/149.1, 149.3, 251/149.6, 149.9
See application file for complete search history.

(56) References Cited

U.S. PATENT DOCUMENTS

| | | | |
|---|---|---|---|
| 6,412,828 B1 * | 7/2002 | Lacroix et al. | 285/316 |
| 7,938,456 B2 * | 5/2011 | Chambaud et al. | 285/316 |

* cited by examiner

*Primary Examiner* — John K Fristoe, Jr.
*Assistant Examiner* — Kevin Barss
(74) *Attorney, Agent, or Firm* — Wang Law Firm, Inc.; Li K. Wang; Stephen Hsu

(57) ABSTRACT

A quick connector includes a socket-shaped main body, and penetrating containing holes formed around the periphery of the main body for containing a first latch element for fixing an external tool connector. The first latch element is controlled by a first control element to fix or loosen the external tool connector. The main body includes aslant penetrating U-shaped slide grooves formed above the containing holes, and each slide groove includes a second latch element pushed by a spring that is sheathed on the periphery of the main body to displace the second latch element in the slide groove and in an axial direction of the main body. The second control element is disposed above the first control element, and the first and second control elements control the latch elements respectively to execute two-stage actions of removing the connector and prevent accidents caused by a possible shoot-out of the connector.

7 Claims, 8 Drawing Sheets

QUICK CONNECTOR

FIELD OF THE INVENTION

The present invention relates to a quick connector, in particular to the two-stage quick connector that facilitates individual controls.

BACKGROUND OF THE INVENTION

With reference to FIG. 8 for the structure of a conventional quick connector, the conventional quick connector comprises a socket 5 for inserting a connector 6, a ball 51 latched into a circular groove 61 formed on the peripheral side of the connector 6 for coupling the socket 5 and the connector 6 securely, so as to use high-pressure gas to drive a tool connected to the other end of the connector 6.

When it is necessary to remove the connector 6, the connector 6 may shoot out to cause accidents since high-pressure gas has not been released but still remains in the socket 5. Therefore, the conventional device generally has an insert slot 52 and an insert rod 53 disposed on the socket 5 and at positions above the ball 51, and the insert rod 53 can be driven to slide along the insert slot 52 when the control element 54 is operated to remove the connector 6. After the ball 51 leaves the circular groove 61 of the connector 6 during the process of removing the connector 6 from the socket 5 as shown in FIG. 9, the ball 51 slides from the insert rod 53 into the circular groove 61 to produce a second-stage latch effect to pause the removal action of the connector 6. Now, the high-pressure gas remained in the connector 6 starts releasing, and the control element 54 will be operated to continue the removal of the connector 6 again after the release of pressure is completed, so as to achieve the effect of removing the connector 6 more safely.

Although the conventional structure involves the two-stage action including the actions for releasing the pressure first and then removing the connector 6, there is only one control element 54 provided for controlling the two-stage action, so that the two-stage actions do not have a clear cut point. In other words, even if the user presses the control element 54 without controlling the pressing force such as pressing the control element 54 without paying attention to the control of the force of pressing at a busy work, then the second-stage removal action may take place without completing the first-stage pressure releasing action. Now, there is still a risk of shooting out the connector 6 by the high-pressure gas.

SUMMARY OF THE INVENTION

Therefore, it is a primary objective of the present invention to provide a quick connector having two control elements for controlling two actions of releasing the pressure and removing the connector respectively to achieve a safe operation.

To achieve the aforementioned objective, the present invention provides a quick connector, comprising:

a socket-shaped main body, with both ends having an opening formed thereon separately, and the opening at one of the ends being disposed on a side corresponding to an air inlet component for supplying a gas, and the other end opening being provided for connecting an external tool connector, and the main body having a plurality of penetrating containing holes formed around the periphery of the main body, and each containing hole containing a first latch element for fixing an external tool connector, and a portion of each first latch element being exposed from each respective containing hole; the main body having a plurality of aslant penetrating U-shaped slide grooves formed on the periphery of the opening and at positions closer to the external tool connector than each of the containing holes, and each slide groove having a second latch element passed into the slide groove, and each second latch element being pushed by a spring sheathed on the periphery of the main body to slide in the slide groove to produce a displacement along an axial direction of the main body;

a first control element, being in a socket form, and sheathed on the first latch element corresponding to the periphery of the main body, and the first control element having an inner peripheral surface, and a middle section of the inner peripheral surface forming an abutting surface normally abutting the first latch element, and the inner peripheral surface having formed a circular groove on the top of the abutting surface, such that when the first control element is moved downward, the first latch element is released from the abutting force of the abutting surface to enter into the circular groove; and a second control element, being in a socket form, and sheathed on the second latch element corresponding to the periphery of the main body, and the second control element being disposed above the first control element, and having a pressing portion formed at the top of the second control element and abutted against the second latch element, such that when the second control element is pressed, the pressing portion controls the second latch element to displace in the slide groove along an axial direction of the main body.

DESCRIPTION OF THE PREFERRED EMBODIMENTS

Figure 1:
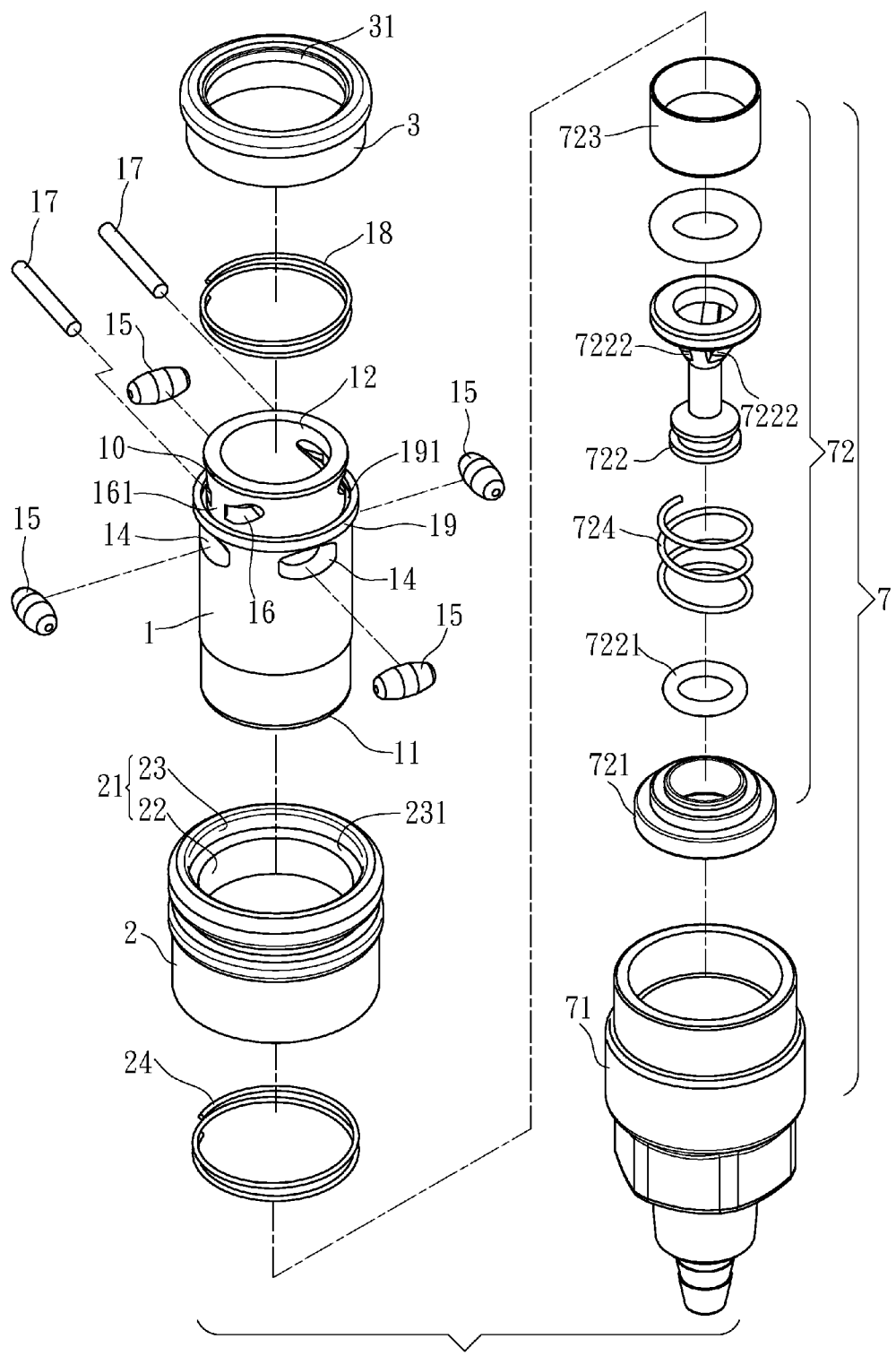
FIG. 1 is an exploded view of the present invention.

With reference to FIG. 1 for a quick connector of the present invention, the quick connector comprises a socket-shaped main body 1, with both ends having an opening an opening 11, 12 formed thereon separately, wherein the opening 11 at one of the ends of the main body 1 is disposed on a side corresponding to an air inlet component 7 for supplying a gas, and at the opening 12 at the other end of the main body 1 is provided for connecting an external tool connector to use a high-pressure gas driven tool. Wherein, the air inlet component 7 includes an air inlet body 71 fixed to the main body 1, and a valve module 72 installed in the main body 1 and the air inlet body 71, and the valve module 72 includes a valve ring 721, a valve plug 722, a propping ring 723 and a propping spring 724. The valve ring 721 is fixed between the main body 1 and the air inlet body 71, and the valve plug 722 is passed into the valve ring 721, and the valve plug 722 has an O-ring 7221 installed at an end proximate to the air inlet body 71 and abutted against the valve ring 721 for opening and closing the valve ring 721, and the other end of the valve plug 722 is abutted against an inner wall of the main body 1 and the valve plug 722 has a plurality of guide holes 7222, and the propping spring 724 is installed between the valve ring 721 and the valve plug 722, and the propping ring 723 can be pressed at the containing hole 14 of the main body 1, so that when the propping ring 723 is pressed to move and prop the valve plug 722, the valve ring 721 is opened to let air flow through the guide hole 7222.

Figure 4:
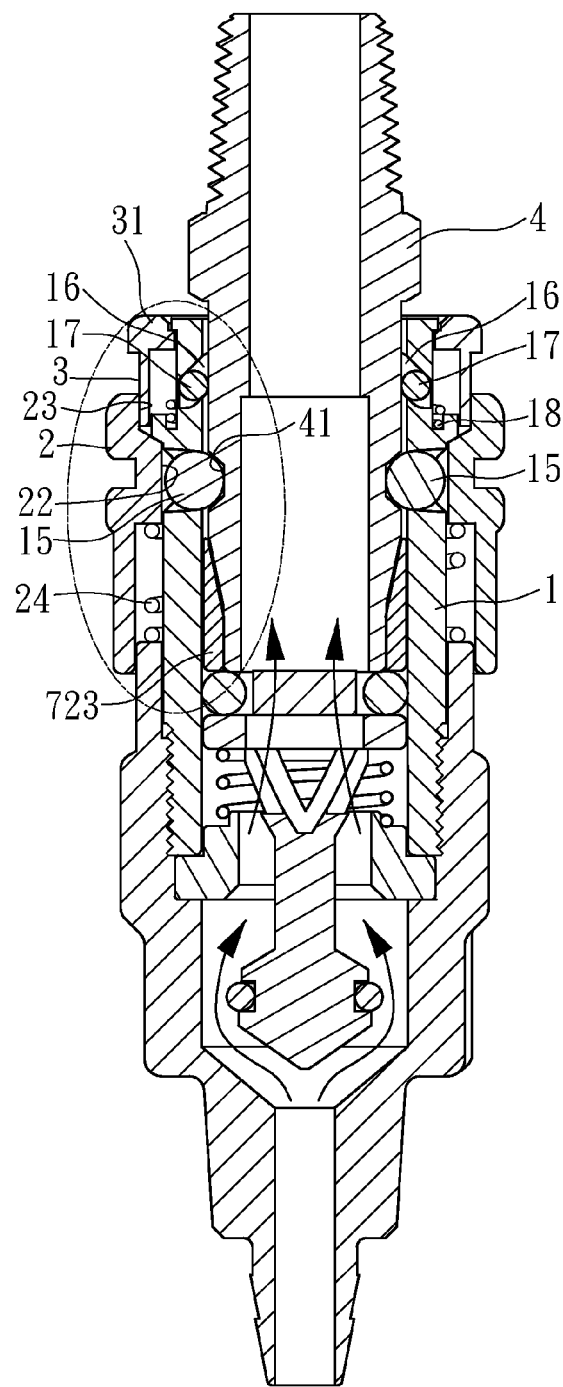
FIGS. 4 to 6 are cross-sectional views of action statuses of the present invention.

The main body 1 has a plurality of penetrating containing holes 14 formed around the periphery of the main body 1, and each containing hole 14 contains a first latch element 15 therein for fixing an external tool connector 4, and a portion of each first latch element 15 is protruded out of the containing hole 14 as shown in FIG. 4 and latched into a slot 41 of the external tool connector 4 for the fixing and positioning purposes. Wherein, the containing hole 14 has a long axis perpendicular to the axial direction of the main body 1 and an long elliptic hole shaped short axis parallel to the axial direction of the main body 1, and the corresponding first latch element 15 has a long ellipsoid ball matched with the shape of the containing hole 14.

Figure 2:
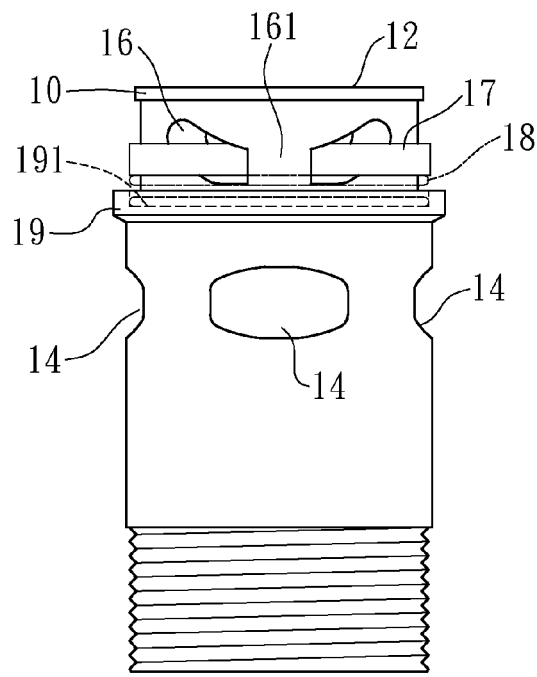
FIG. 2 is a side view of a main body of the present invention.
Figure 3:
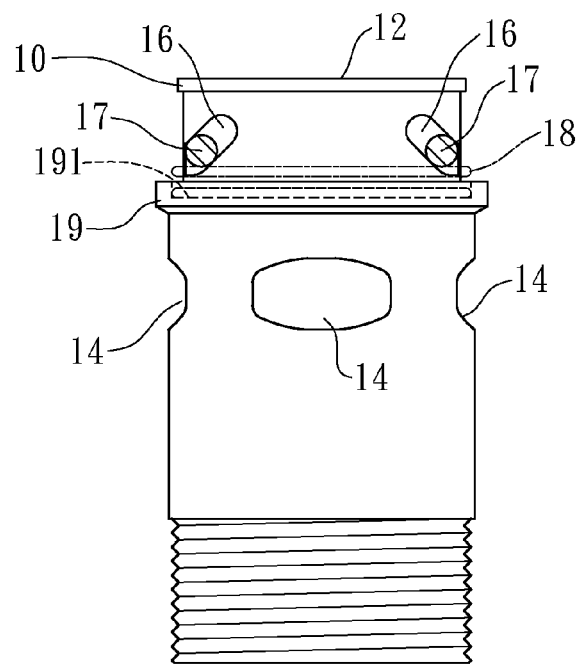
FIG. 3 is another side view of a main body of the present invention.

With reference to FIGS. 2 and 3, the main body 1 has a plurality of aslant penetrating U-shaped slide grooves 16 formed on the periphery of the opening 12 and at positions closer to the external tool connector than each of the containing holes 14, and each U-shaped slide groove 16 has a second latch element 17 passed into the slide groove 16, and a flange 19 is formed around the periphery of the main body 1 and disposed between the containing hole 14 and the slide groove 16, a containing groove 191 is concavely formed along the top of the flange 19, and a spring 18 is contained in the groove and sheathed on the periphery of the main body 1 for pushing the second latch element 17, and each second latch element 17 is pushed by the spring 18 to displace in the slide groove 16 and along an axial direction of the main body. Wherein, the slide groove 16 has a stop member 161 formed on the main body 1 and at the position of the opening for preventing the second latch element 17 from falling out from the slide groove 16.

Figure 7:
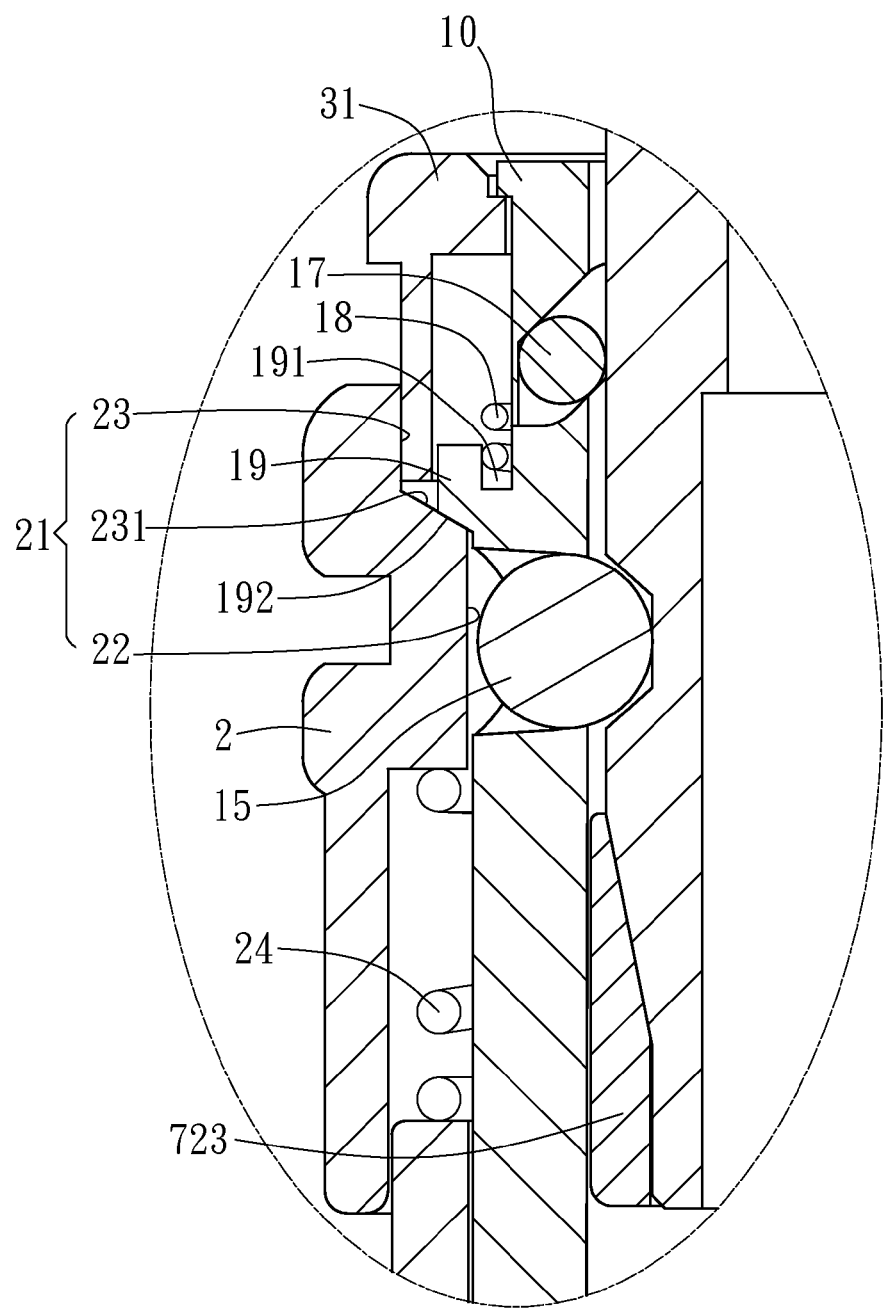
FIG. 7 is a partial blow-up view of FIG. 4.
Figure 8:
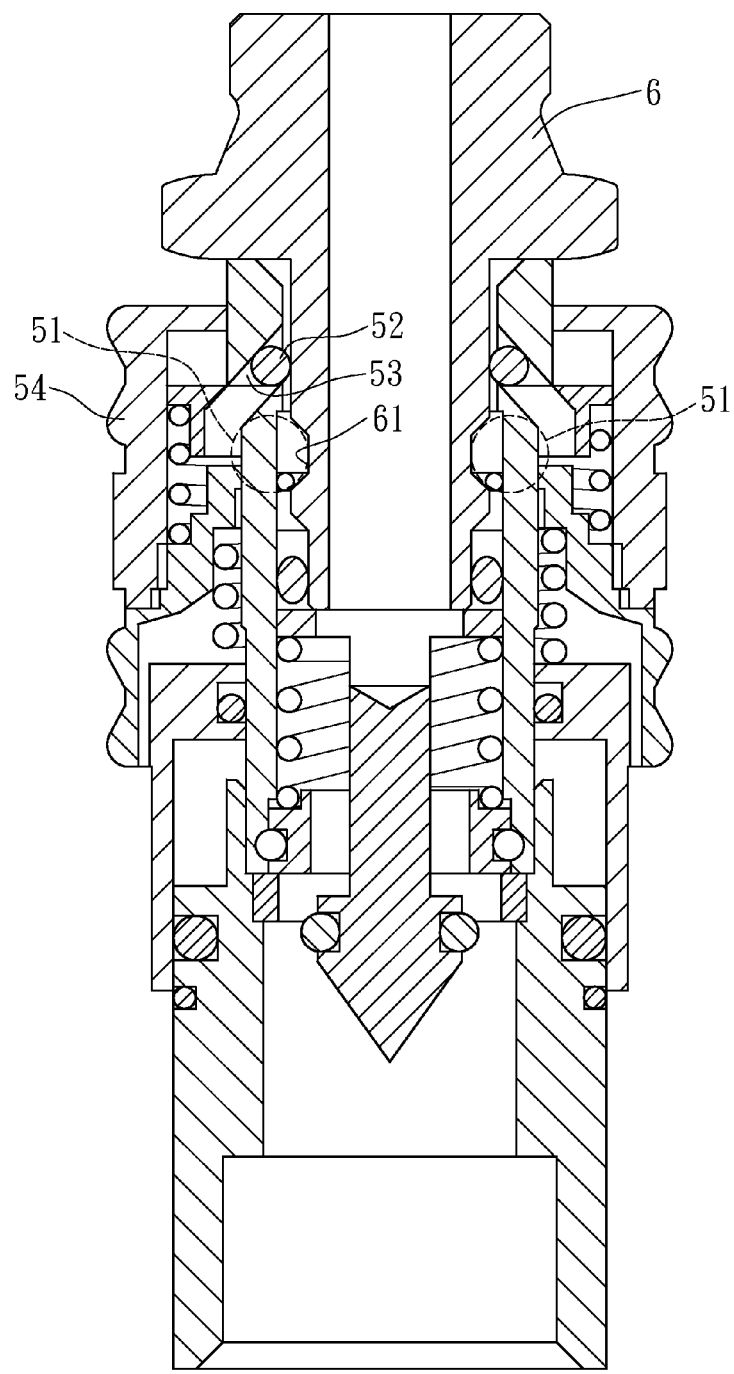
FIGS. 8 and 9 are cross-sectional views of action statuses of a conventional quick connector.
Figure 9:
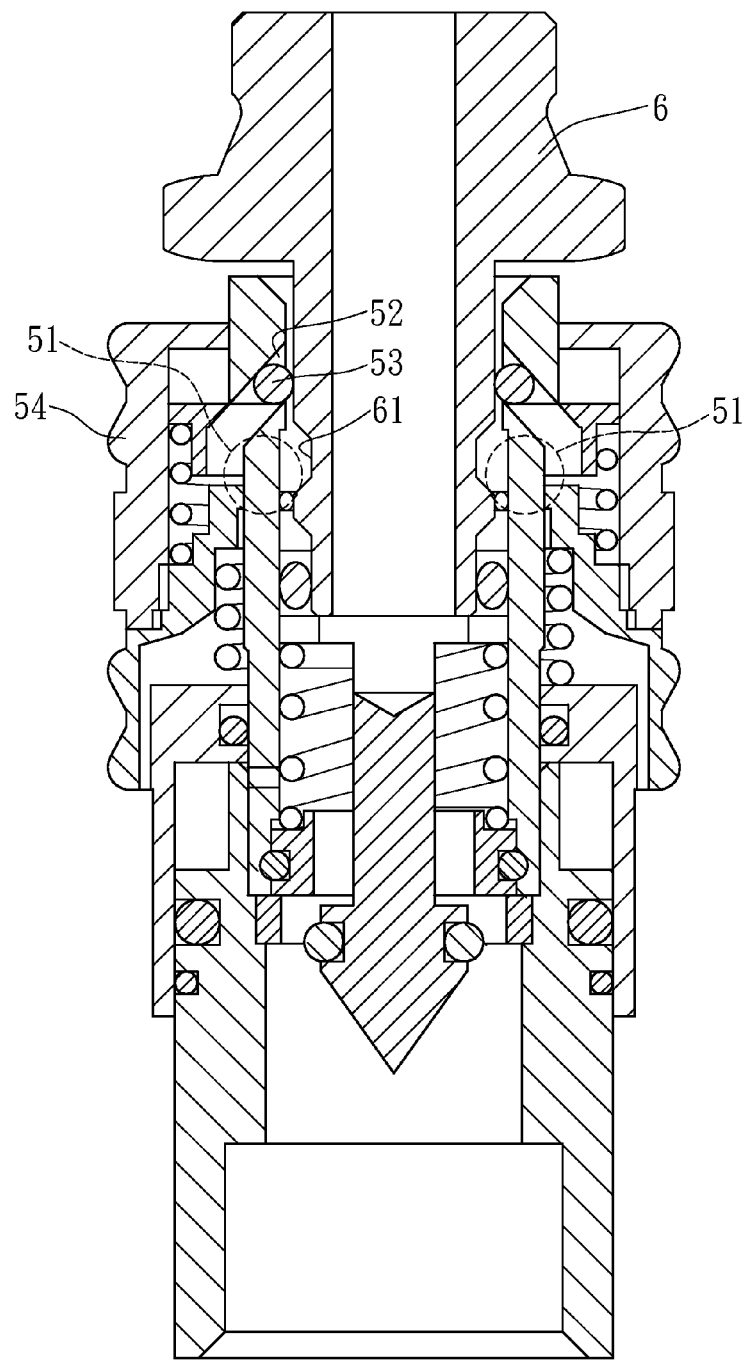

In FIGS. 1 and 7, the main body 1 has a socket-shaped first control element 2 sheathed on the periphery of the main body 1 and corresponding to the first latch element 15, and the first control element 2 includes an inner peripheral surface 21, and an abutting surface 22 is formed at the middle section of the inner peripheral surface 21 for abutting the first latch element 15, and the inner peripheral surface 21 has a circular groove 23 formed at the top of the abutting surface 22, wherein the first control element 2 is pushed by the position restoring spring 24 sheathed on the periphery of the main body 1 and disposed there below, so that the bottom 231 of the circular groove 23 upwardly abuts the bottom 192 of the flange 19 of the main body 1 to achieve the positioning effect, so that the bottom 192 of the flange 19 is positioned. Therefore, the abutting surface 22 is normally abutted against the first latch element 15, wherein the bottom 192 of the flange 19 has an inclination, and the bottom 231 of the circular groove 23 of the first control element 2 has an inclination at the bottom 192 of the flange 19, so that the first control element 2 is pushed by the position restoring spring 24 to abut the bottom 231 of the circular groove 23 against the bottom 192 of the flange 19. When the first control element 2 is displaced downward as shown in FIGS. 4 and 5, the first latch element 15 is released from the abutting force of the abutting surface 22 and pushed by the propping ring 723 to enter into the circular groove 23; and the first control element 2 can restore its original position by the action of the position restoring spring 24 after the first control element 2 is no longer pressed.

In addition, the main body 1 has a socket-shaped second control element 3 sheathed on the periphery of the main body 1 and corresponding to the position of the second latch element 17, wherein the second control element 3 is disposed above the first control element 2, and the second control element and the first control element 2 are separate control elements. The second control element 3 has a pressing portion 31 formed at the top of the second control element 3 and abutted at the second latch element 17, so that when the second control element 3 is pressed, the pressing portion 31 pushes the second latch element 17 to displace in the slide groove 16 and in an axial direction of the main body 1. Similarly, after the second latch element 17 is controlled and displaced by the second control element 3, the spring 18 pushes the second latch element 17 to restore its original position. In addition, the main body 1 has a stop portion 10 extended outwardly in an axial direction and corresponding to an end of the second control element 3, so that the second control element 3 can abut its pressing portion 31 against the stop portion 10 to prevent the second latch element 17 from falling out from the main body 1.

Figure 5:
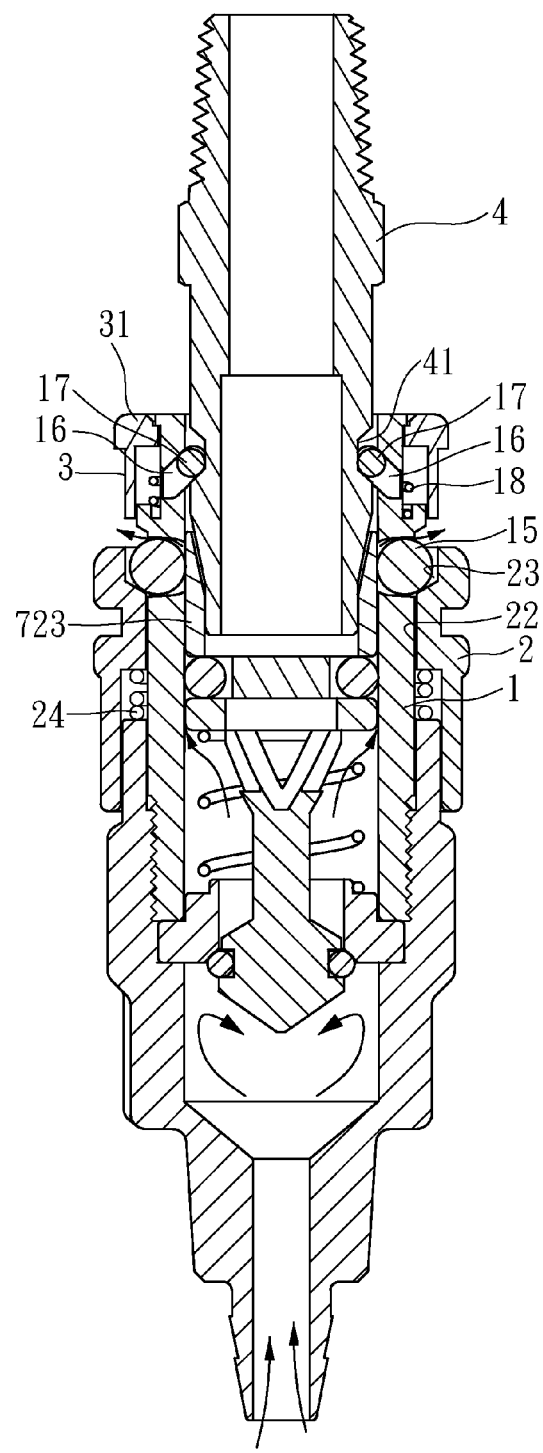
Figure 6:
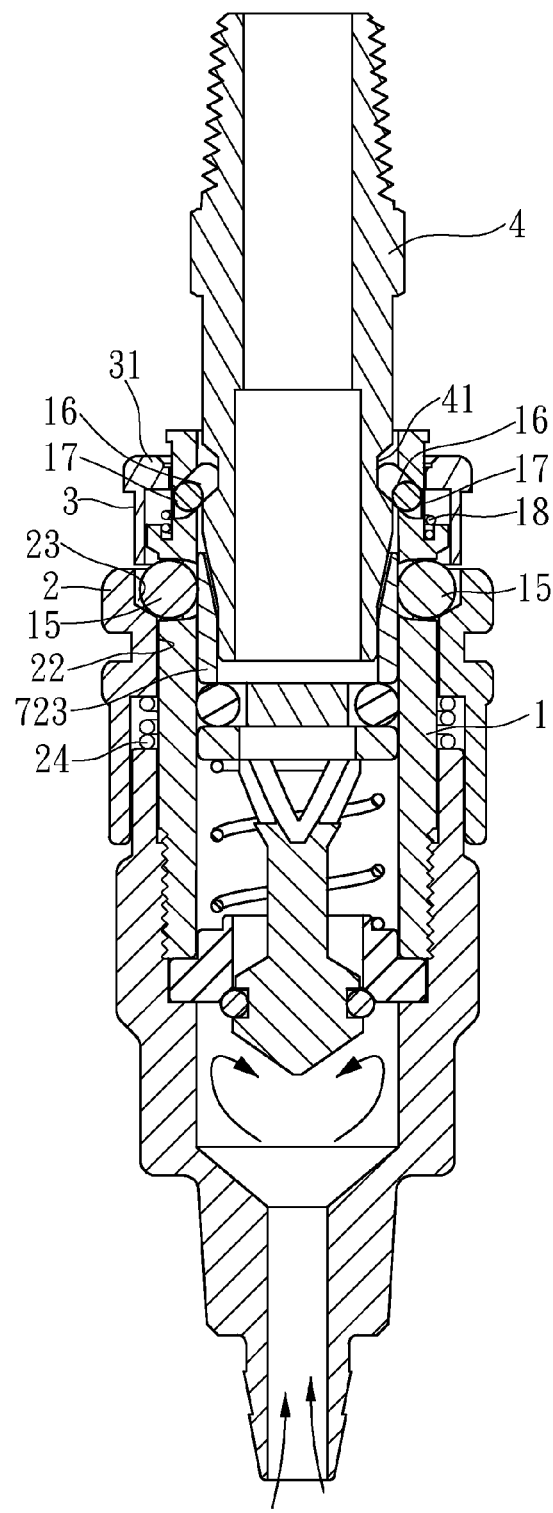

When the present invention with the aforementioned components is used as shown in FIGS. 4 to 6, an external tool connector 4 is connected as shown in cross-sectional view of FIG. 4, which indicates an initial status of the removed connector. In the figures, the first latch element 15 is latched into the slot 41 of the external tool connector 4 for the securing and positioning purposes. Now, the high pressure gas enters from the opening of an air inlet component connected to the main body 1 to drive a tool. When the connector is removed as shown in FIG. 5, the first control element 2 is displaced downward, and then the circular groove 23 of the first control element 2 is moved to a position corresponding to the first latch element 15, so that the first latch element 15 is entered into the circular groove 23 and separated from the slot 41 of the external tool connector 4 to pull the external tool connector 4 outward. Now, the second latch element 17 is pushed by the spring 18 and fallen into the slot 41 of the external tool connector 4 to provide a secondary latch effect and produce a hindrance for removing the connector. In the meantime, the high-pressure gas remained in the main body 1 is released from a gap of the slot 41 of the first latch element 15. After the pressure is released as shown in FIG. 6, the second control element 3 is pressed to drive the pressing portion 31 to push the second latch element 17 to displace downward along the slide groove 16, so as to separate the second latch element 17 from the slot 41 of the external tool connector 4. Such arrangement allows the connector 4 to be removed without any hindrance, and the connector 4 can be unplugged without worrying about the danger caused by the shoot-out of the connector 4 due to the high-pressure gas.

What is claimed is:

1. A quick connector, comprising:
 a socket-shaped main body, with both ends having an opening formed thereon separately, and the opening at one of the ends being disposed on a side corresponding to an air inlet component for supplying a gas, and the opening at the other end being provided for connecting an external tool connector, and the main body having a plurality of penetrating containing holes formed around the periphery of the main body, and each containing hole containing a first latch element for fixing an external tool connector, and a portion of each first latch element being exposed from each respective containing hole; the main body having a plurality of aslant penetrating U-shaped slide grooves formed on the periphery of the opening and at positions closer to the external tool connector than each of the containing holes, and each slide groove having a second latch element passed into the slide groove, and each second latch element being pushed by a spring sheathed on the periphery of the main body to slide in the slide groove to produce a displacement along an axial direction of the main body;

a first control element, being in a socket form, and sheathed on the first latch element corresponding to the periphery of the main body, and the first control element having an inner peripheral surface, and a middle section of the inner peripheral surface forming an abutting surface normally abutting the first latch element, and the inner peripheral surface having formed a circular groove on the top of the abutting surface, such that when the first control element is moved downward, the first latch element is released from the abutting force of the abutting surface to enter into the circular groove; and a second control element, being in a socket form, and sheathed on the second latch element corresponding to the periphery of the main body, and the second control element being disposed above the first control element, and having a pressing portion formed at the top of the second control element and abutted against the second latch element, such that when the second control element is pressed, the pressing portion controls the second latch element to displace in the slide groove along an axial direction of the main body.

2. The quick connector of claim 1, wherein the main body includes a position restoring spring installed on the periphery of the main body and sheathed on the bottom of the first control element for resuming the first control element to its original position.

3. The quick connector of claim 2, wherein the main body includes a flange formed around the periphery of the main body and between the containing hole and the slide groove, and the flange having a containing groove concavely formed on a surface of the flange for containing a spring that abuts the second latch element, and the bottom of the flange having an inclination, and the bottom of the circular groove of the first control element corresponding to the inclination of the bottom of the flange, so that the first control element is abutted by the position restoring spring to press the bottom of the circular groove against the bottom of the flange, and the main body having a stop portion extended axially outward with respect to an end of the second control element for pressing the pressing portion of the second control element against the stop portion to prevent the second control element from being separated from the main body.

4. The quick connector of claim 1, wherein the slide groove includes a stop member formed on the main body and at a position of the opening.

5. The quick connector of claim 1, wherein the containing hole has a long axis perpendicular to an axial direction of the main body, and a long elliptic hole formed parallel to the axial direction of the main body, and the first latch element has a long ellipsoid matched with the containing hole.

6. The quick connector of claim 1, wherein the air inlet component includes an air inlet body fixed to the main body, and a valve module installed in the main body and the air inlet body.

7. The quick connector of claim 6, wherein the valve module includes a valve ring, a valve plug, a propping ring and a propping spring, and the valve ring is fixed between the main body and the air inlet body, and the valve plug is passed into the valve ring, and the valve plug has an O-ring installed at a position proximate to an end of the air inlet body and pressed against the valve ring to selectively open and close the valve ring, and the other end of the valve plug is pressed against an inner wall of the main body and has a plurality of guide holes, and the propping spring is installed between the valve ring and the valve plug, and the propping ring presses against the containing hole of the main body, so that when the propping ring is pressed and moved to press against the valve plug, the valve ring is open to let air flow through the guide hole.

\* \* \* \* \*